United States Patent

[11] 3,620,773

[72] Inventor  Robert P. Gabriel
              20 Meadowview Road, Melrose, Mass.
              02176
[21] Appl. No. 813,332
[22] Filed     Apr. 3, 1969
[45] Patented  Nov. 16, 1971

[54] METHOD FOR TREATING HARVESTED NONCHLOROPHYLLEOUS PRODUCE
     13 Claims, No Drawings

[52] U.S. Cl. ................................................. 99/154,
                    99/156, 424/80, 260/615 B, 252/106
[51] Int. Cl. ......................................... A23b 7/00,
                                                    A61k 27/00
[50] Field of Search ........................................... 99/154,
           156, 168, 222, 223; 424/80; 260/615 B; 252/106

[56]                  References Cited
                  UNITED STATES PATENTS
2,739,922  3/1956  Shelanski ....................  167/70
2,826,532  3/1958  Hosmer .......................  167/70
2,853,416  9/1958  Kellog ........................  167/33
2,872,433  2/1959  Glickman ....................  260/45.7
2,977,315  3/1961  Schieb .........................  252/106
3,029,183  4/1962  Winicov ......................  167/17
3,277,010  10/1966 Schenck ......................  252/106
2,715,582  8/1955  Marks et al. .................  99/154
                    OTHER REFERENCES J. W. McCutcheon, Detergents and Emulsifiers, 1963, pp. 44 and 74

*Primary Examiner*—Norman Yudkoff
*Assistant Examiner*—Hiram H. Bernstein
*Attorney*—Thomson & Mrose ABSTRACT: A method for controlling rot and decay in harvested nonchlorophylleous produce whereby the produce is sprayed or dipped into an aqueous solution containing an iodine releasing polymeric surfactant-iodine complex, a compatible surface active agent and sufficient acid to render the solution at least slightly acidic. This method is particularly adapted for treating vegetables and fruits including corn, cucurbits, bananas and potatoes.

METHOD FOR TREATING HARVESTED NONCHLOROPHYLLEOUS PRODUCE

BACKGROUND OF THE INVENTION

This invention relates generally to methods for controlling micro-organisms in harvested nonchlorophylleous plants and more particularly to methods for controlling airborne and plantborne pathogens in harvested nonchlorophylleous produce whereby the harvested product is treated with an aqueous solution of a biocidal surfactant-iodine complex.

Although a variety of techniques have been developed for protecting growing plants from destruction by soilborne pathogens, no effective or completely satisfactory method has heretofore been developed for protecting harvested produce from the deleterious effects of air, water or plantborne pathogens which often are the prime cause of rot and decay in the harvested product. During the storage of raw, whole agricultural products, particularly fruits and vegetables, destructive pathogens, usually transient on the surface of plant, often infect the harvested product through skin lesions, stem wounds, bud boils and the like, and may eventually consume the host or infect adjacent produce.

Several techniques have been suggested for controlling pathogen damage during post harvest storage, but none of these techniques have proven to be entirely effective. Most commonly, such techniques have centered about fumigation processes whereby the harvested product is exposed to a blanket of an inert gas, such as nitrogen, which deprives the pathogens of essential oxygen. Such processes, however, are slow and inefficient and usually require expensive equipment to contain the gas during treatment. Moreover, inert gas treatment is at best only partially effective, and there is no lasting effect in controlling the undesirable micro-organisms. During extended periods prior to processing into prepared foods, or prior to purchase by the consumer, the produce treated according to prior art techniques can again become subjected to pathogen destruction.

While fumigation of the soil prior to planting will have some minimal lasting effect in preventing the initial occurrence of many soil and plantborne pathogens, such techniques have virtually no effect in controlling air or waterborne pathogens which can infect the produce even during the short period transpiring between transportation of the harvested product from the field to the storage area. Moreover, while it may be desirable to treat the soil prior to planting in order to protect the growth of the plant, this technique is not an entirely satisfactorily solution even for the limited purpose of controlling the effect of soilborne pathogens in the post harvested product. The usual method of fumigating the soil is to treat the soil with a toxic liquid or gas. To effectively contact the fumigant with the soil, most fumigant compositions require a water seal whereby the treated area is covered to prevent escape of the biocide. Once soil treatment is complete, the fumigant must be removed from the soil to prevent damage to the plant by the fumigant itself. Even when using those few fumigants which do not require a water seal or other after treatment, the process of soaking the soil requires such a huge quantity of fluid that this technique cannot economically be used on large scale open fields. Accordingly these prior art techniques have been limited to the treatment of plants grown in hothouses.

For instance, it is disclosed in U.S. Pat. No. 2,853,416 that a good soil fumigant for chlorophylleous plants comprises an iodine complex of polymeric N-vinyl-2-pyrrolidone which can be applied to the soil in aqueous solution. Although the solution need not be removed from the soil prior to planting of the crops, effective treatment of the soil requires such a substantial quantity of solution that this technique is economically unfeasible for large scale crop production. Moreover, the composition disclosed in that reference is only indicated as being effective for chlorophylleous or leafy plants and hence is impliedly ineffective for treating nonchlorophylleous produce such as root crops, corn and cucurbits.

Another disadvantage of the state of the art fumigants is that many are toxic to warmblooded animals and can cause skin irritations and burns particularly in human beings. The fumigant must therefore be completely removed from the product by washing before it can be marketed, a procedure which requires additional processing before the product can be sold.

It would be desirable therefore to provide a technique whereby the harvested fruit or vegetable can be treated directly so as to control the effects of pathogenic micro-organisms that tend to cause rot or decay during storage. It would also be desirable to provide a method for controlling airborne and waterborne pathogens as well as soilborne pathogens without the necessity for special equipment to contain a gaseous fumigant. It would further be desirable to provide a technique for treating vegetables and fruits with a safe, nontoxic liquid solution, after harvesting the product, to control rot and decay initiated by airborne, soilborne and waterborne pathogens.

SUMMARY OF THE INVENTION

By way of summary account of underlying recognitions of preferred practices of this invention, there is provided herein a method for treating harvested fruit and vegetables wherein the harvested produce is sprayed or dipped into an aqueous solution containing water-soluble concentrate having 1 to 30 parts by weight of an iodine releasing polymeric surfactant-iodine complex, 0.50 to 6 parts by weight of a compatible surface active agent and sufficient acid to render the solution at least slightly acidic.

Accordingly, it is an object of this invention to provide a method for treating harvested fruits and vegetables to control destruction by pathogenic micro-organisms.

It is another object of this invention to provide a method for whereby harvested produce can be treated with an aqueous germicidal solution which can safely be applied to the produce and which is nontoxic to warmblooded animals.

Still another object of this invention is to provide a method for spraying or dipping harvested produce into an aqueous solution of a biocidal material in order to control airborne, waterborne or soilborne initiated rot or decay.

Although the features of this invention which are considered to be novel are set forth in the appended claims, further details as to preferred practices and as to further objects and advantages therefore may be most readily comprehended with reference to the following description.

DETAILED DESCRIPTION OF THE INVENTION

According to the present invention, nonchlorophylleous harvested produce may be treated, preferably by spraying or dipping, with an aqueous solution of surfactant-iodine complex, a compatible surfactant and sufficient acid to render the solution at least slightly acidic.

The biocidal effect of the present aqueous solution is provided by the action of the iodine from the surfactant-iodine complex which is capable of destroying fungical spores and bacteria of those plant pathogens usually involved in economic losses of stored agricultural products. The surfactant-iodine complex is used instead of pure iodine, which is highly toxic and can cause severe skin irritations and blisters in warmblooded animals particularly humans. This invention, therefore uses the iodine in a complex with a compatible surfactant, which has the capability of releasing iodine in a nontoxic form over an extended period of time. When used in this form the irritating and sensitizing effects of the iodine is significantly reduced, although the biocidal and germicidal properties are substantially unimpaired.

One form of the surfactant-iodine complex used in this invention is disclosed in U.S. Pat. No. 2,789,922 which describes a polyvinylpyrrolidone iodine complex formed by mixing and heating elemental iodine or an iodine containing compound with polyvinylpyrrolidone. The iodine may be in the form of pure iodine, Lugol's solution, colloidal iodine suspensions, salts of iodine, iodides, iodates and iodites or acids of iodines such as HI and HIO. Regardless of the form, the iodine may admixed with the polymer in amounts as high as 35 percent by weight although amounts of between 1.5 to 25 percent by weight based on the weight of the complex will inturn enable certain dilutions to provide adequate biocidal action on the harvested product. The iodine may be incorporated into the surfactant either by a dry mixing or grinding process, or by mixing the iodine and surfactant in an aqueous solution under conditions of mild heating.

For the purposes of this invention, polyvinylpyrrolidone-iodine complexes are preferred because of the physiological acceptance of polyvinylpyrrolidone. The vapor pressure of the iodine when complexed with polyvinylpyrrolidone is reduced to a degree that the bacteriacidal and germicidal properties of the complex can be retained over a particularly long period of time. Moreover, the foaming characteristics of polyvinylpyrrolidone makes it particularly advantageous for use in spray solutions or dip solutions.

While polyvinylpyrrolidone is the preferred form of surfactant-iodine complex in this invention, other complexes can similarly be prepared and used. For example, water-soluble inter-polymers of polyvinylpyrrolidone with other vinyl phthalamide, vinyl pyridine, acrylamide or vinyl caprolactam. Homopolymers, chemically related to polyvinylpyrrolidone, may be used such as polyvinyl caprolactam, polymerized gamma-valerolactam and polyvinyl-e-valerolactam. Other complexes which are particularly desirable due to their safe, nontoxicity for most warmblooded animals, may be formed with nonylphenoxy-polyoxyethylene-ethanol or alpha-(P-nonylphenyl)-omega-hydroxypoly (oxyethylene) produced under the trademark Clean Front by West Laboratories, and VR O-20 produced by General Aniline and Film Corporation.

It is desirable to include in the concentrate, for the spray solution or dip solution, about 1 to 30 parts by weight of the complex, but good results are obtainable when using between 5 and 20 parts by weight.

The surface active agent used with the surfactant-iodine complex functions to reduce the surface tension of the solution so that maximum wetting and draining of the treated surface will be accomplished. For this purpose, any compatible surfactant can be used, but particularly good results are obtainable with anionic and nonionic surface active agents such as the alkyl aryl sulfates, the alkyl aryl sulfonates, the higher fatty alcohol sulfates, the higher fatty alcohol sulfonates, the polyglycol ethers of alkyl phenols, the higher fatty alcohols and the polyglycol ethers esters of higher fatty acids. Especially good results are obtainable with the polyoxyethylated nonylphenols condensed with 9 to 12 moles of ethylene oxide, since it is especially safe and nontoxic to warmblooded animals.

The acid and the aqueous solution acts primarily as a buffer to maintain the solution in at least a slightly acidic condition. The specific pH is dependent upon the particular harvested products being treated and on the degree of biocidal action required. It has been found however, that for most harvested products, a pH of approximately 3 to 4.5 provides good results. Suitable acids for this purpose include the compatible organic and mineral acids such as phosphoric acid, hydrochloric acid, glycolic acid, citric acid, acetic acid, tartaric acid, fumaric acid and salicylic acid. Phosphoric acid and glycolic acid are particularly desirable when used in amounts sufficient to provide a pH of about 3.3, since they provide synergistic results in combination with the surfactant-iodine somplex to inhibit the development of *Fusarium roseum* spores. Glycolic acid will also provide synergistic effects in controlling the development of *Verticillium albo-atrum spores* and *Corynebacterium sepodonicum*.

Having generally described the invention, a further understanding can be obtained by reference to several specific examples. It should be clearly understood, however, that these examples are presented for purpose of illustration only and are not to be construed as limiting in any manner.

The following specific formulations are suitable for use in the treatment of harvested, nonchlorophylleous produce:

| | |
|---|---|
| Example I | |
| Synthetic surfactant-iodine complex (as VRO-20) (Nonylphenoxypolyoxyethyleneethanol-iodine complex provides 1.75% titratable iodine) | 9% |
| Glycolic acid (100% | 5% |
| Surfactant (as Igepal 880) (polyoxyethylated nonylphenol) | 7% |
| Water | 79% |
| Example II | |
| Synthetic surfactant-iodine complex (as VRO-20) (Nonylphenoxypolyoxyethyleneethanol-iodine complex provided 1.75% titratable iodine) | 9% |
| Phosphoric Acid (100%) X | 5% |
| Surfactant (as Igepal 880) (polyoxyethylated nonylphenol) | 7% |
| Water | 79% |
| Example III | |
| polyvinylpyrrolidone iodine complex as (as PVP Iodine 10) (provides 1% iodine) | 10% |
| Phosphoric acid (100% | 2% |
| Surfactant (as Igepal 630) (polyoxyethylated nonylphenol) | 1.5% |
| Water | 86.5% |
| Example IV | |
| Polyvinylpyrrolidone-iodine complex (as PVP-Iodine 10) (provides 1% titratable iodine) | 10% |
| Glycolic acid (100%) | 2% |
| Surfactant (as Igepal 630) (polyoxyethylated nonylphenol) | 1.5% |
| Water | 86.5% |
| Example V X | |
| Polyvinylpyrrolidone-Iodine complex (as PVP-Iodine 10) (provides 2% titratable iodine) | 20% |
| Phosphoric acid (100% | 5% |
| Surfactant (as Igepal 630) polyoxyethylated nonylphenol) | 3% |
| Water | 72% |

Bacteriological tests using these formulas show a high degree of efficacy in the treatment of various plantborne, waterborne, and airborne pathogens. In conducting these tests, the following procedure was followed; 2 mls. of Czapek-Dox broth were added to test tubes containing 2 mls. of formula 1, yielding a 75 p.p.m. iodine solution. One loopful of the test organism from the stock cultures was added to each tube and agitated. The controls were prepared in a similar manner with the exception that 2 mls. of sterile-distilled water were added to the tubes in place of formula 1. After 2 minutes, a loopful of bacteria plus liquid were withdrawn from each tube aseptically and innoculated into a flask containing 100 mls. of the Czapek-dox broth. The innoculated flasks were placed on a shaker for 24 hours for Erwinia Atrospectica and *Pseudomonas fluorescens*. *Corynebacterium sepodonicum* was maintained in the shaker for 3 to 5 days because of the slow growth rate. Bacterial growth was determined by measuring turbulance of the broth as optical density on a Spectronic 20 at 555 mu and the treatments were compared with controls.

One mls. of 4x concentration of Conidia was added to 1 ml. of formula 4. At the end of 2 minutes, 2 mls. of 0.1 N sodium thiosulfate was added to each of the three tubes and the tubes were aggitated. The sample was withdrawn from each tube by a pipette and a drop placed on either end of the glass slide. The slide was placed at a petri dish and incubated at room temperature for 24 hours. The drops containing the spore suspensions were then examined microscopically. Spores were considered to be germinated if the germ tube was longer than the width of the spore. Controls were treated in a similar manner except that 1 ml. of sterile distilled water was substituted for formula 4. Germination was determined by counting 100 spores per drop reported as percent germination.

Table I summarized the results of these tests.

TABLE I

| Formulation diluted to make available 75 p.p.m. iodine | Organism Verticillium albo-atrum (Verticillium wilt) | Fusarium roseum (tuber rot) | Corynebacterium sepodonicum (ring rot) | Erwinia atrospectica | Pseudomonas fluorescens |
| --- | --- | --- | --- | --- | --- |
| Formula I growth after 2 min. exposure | 0 | 0 | 0 | 0 | 0 |
| Control | [1] 84 | [2] 0.180 | [2] 0.21 | [2] 0.105 | [2] 0.02 |
| Formula IV growth after 2 min. exposure | 0 | 0 | 0 | [3] | [3] |
| Control | [1] 39 | [1] 4.54 | [1] 94 | | |

[1] Average percent germination.  [2] Optical density.  [3] No data.

Five day old Czapek-Dox broth cultures of *Corynabacterium sepodonicum* and 10 to 14 day old cultures of *Fusarium roseum* grown on potatoedextros agar were used in the experiments. The control formulation of agar used in these tests contained infusion from 200 grams (20 percent autoclaved potatoes, 15 grams of dextrose, 15 grams of agar per liter. A 1 to 1,000 mls. dilution of *Corynebacterium spodonicum* was prepared and 1 ml. was added to 999 mls. of sterile distilled water under septic conditions. A sterile loopful of this solution was streaked across each plate containing the test material in the agar. For innoculation of *Fusarium roseum*, sterile-distilled water was added to a pure culture of *Fusarium roseum*. With a sterile loop, the spores were loosened from the mycellium by agitation. A loopful of the spore streaked across the plates. Plates of all tests were examined for evidence of growth 2 to 4 days after innoculation. The results of this test are summarized below.

TABLE II

| Formulation diluted to make available 150 p.p.m. iodine | Fusarium roseum (tuber rot) | Organism Verticillium albo-atrum (Verticillium wilt) | Corynebacterium sepodonicum (ring rot) |
| --- | --- | --- | --- |
| Formula II growth in 100% potatoe agar. | 0 | Not tested | 0 |
| Control | [1] | | [1] |
| Formula III growth in 100% potatoe agar. | 0 | ....do...... | 0 |
| Control | [1] | | [1] |

[1] Heavy growth.

In using these solutions for treating harvested produce it has been found that 1 gallon of concentrate will effectively inhibit the growth of deleterious pathogenic micro-organisms in 20,000 pounds of potatoes. The preferred dilution of the concentrate is about 65 gallons of water for each gallon of concentrate.

It should be noted that all formulations tested evidenced efficacy in controlling the subject pathogens, even in the presence of high-starch content (100percent potato agar).

Although the surfactant-iodine complexes are known to have been used in the prior art for preparing germicidal compositions for various purposes, prior to the present invention there have been no sprayable or liquid preparations commercially available for treating harvested nonchlorophylleous produce which are capable of effectively controlling pathogenic organisms and there has been no disclosure of the concept of using a surfactant-iodine complex for treatment of nonchlorophylleous harvested fruits and vegetables for protection against destructive airborne and plantborne pathogens. Moreover, the fact that these complexes are effective for their disclosed purpose, is particularly surprising since the biocidal action of the iodine content must not only be released from the complex, but also need not be systemic, i.e., need not be absorbed or otherwise penetrated through the skin of the product, to be effective. The use of this type of complex in aqueous solutions therefore, not only enables a unique method for treating harvested produce by spraying or dipping, but also provides a unique method for controlling rot and decay in harvested products, and yet permits removal of residues by simple washing.

Many modifications can be made to the present invention without departing from its spirit or scope. Accordingly, it should be understood that the embodiments and practices herein described have been presented by way of disclosure rather than limitation, and various modifications, combinations, and substitutions may be effected by those skilled in the art without departure from this invention in its broader aspects is saidforth in the appended claims.

What is claimed and intended to be covered by Letters Patent is:

1. A method for controlling rot and decay caused by pathogens selected from the group consisting of *Verticillium, Albo-atrum, Fusarium roseum Corynebacterium sepodonicum, Erwinia atrospectica, Pseudomonas fluorescens*, in harvested, nonchlorophylleous produce with an aqueous solution of water-soluble concentrate comprising 1 to 30 parts by weight of an iodine releasing polymeric surfactant-iodine complex selected from the group consisting of iodine complexes of polyvinylpyrrolidone and copolymers of polyvinylpyrrolidone with another vinyl monomer selected from the group consisting of vinyl phthalamide, vinyl pyridine, acrylamide, and vinyl caprolactam, polyvinyl caprolactam, polymerized gamma-valerolactam, polyvinyl-epsilon-valerolactam, nonylphenoxy-polyoxethylene-ethanol and alpha-(P-nonylphenyl)-omega-hydroxypoly(oxyethylene), containing from about 5 to 35 percent by weight of combined iodine based on the weight of said complex, 0.50 to 6 parts by weight of a compatible surface active agent, and sufficient acid to render said solution at least slightly acidic.

2. The method in claim 1 wherein said surfactant-iodine complex is a polyvinylpyrrolidone-iodine complex.

3. The method of claim 1 wherein said surfactant-iodine complex is a nonyl phenoxy polyoxyethylene-ethanol-iodine complex containing from about 5 to 25 percent by weight combined iodine, based on the weight of said complex.

4. The method of claim 1 wherein said surfactant-iodine complex is an alpha-(P-nonylphenyl)-omega-hydroxpoly(oxyethylene)-iodine complex containing between 5 and 20 percent combined iodine based on the weight of said complex.

5. The method of claim 1 wherein said surface active agent is selected from the group consisting of compatible nonionic and anionic surface active agents.

6. The method of claim 5 wherein said surface active agents are selected from the group consisting of alkyl aryl sulfates, alkyl aryl sulfonates, higher fatty alcohol sulfates, higher fatty alcohol sulfonated, polygylcol ethers of alkyl phenols, higher fatty alcohols and the polyglycol ethers esters of higher fatty acids.

7. The method of claim 6 wherein said surface agent is a polyoxyethylated nonylphenol containing between 9 and 12 moles of combined ethylene oxide.

8. The method of claim 1 wherein said aqueous solution contains sufficient acid to provide a pH of between 3 and 4.5.

9. The method of claim 8 wherein the acid is selected from the group consisting of glycolic acid, phosphoric acid, hydrochloric acid, citric acid, and acetic acid.

10. The method of claim 1 wherein said aqueous solution is sprayed onto said harvested produce.

11. The method of claim 1 wherein said harvested produce is dipped into said aqueous solution.

12. A method for controlling rot and decay caused by pathogens selected from the group consisting of *Verticillium, Albo-atrum, Fusarium roseum, Corynebacterium sepodonicum, Erwinia atrospectica, Pseudomonas fluorescens*, in harvested, nonchlorophylleous produce selected from the group consisting of corn, cucurbits, bananas, and potatoes, which comprise treating said produce with an aqueous solution of a water-soluble concentrate comprising 5 to 20 parts by weight of a polyvinylpyrrolidone-iodine complex, containing from about 1.5 to 25 percent combined iodine based on the weight of said complex, 0.4 to 10 parts by weight of phosphoric acid, and 0.75 to 3 parts by weight of a polyoxyethylated nonylphenol condensed with 9 to 12 moles of ethylene oxide.

13. The method of claim 12 wherein said aqueous solution is sprayed onto said produce.

* * * * *